US008148681B2

(12) United States Patent
Syms et al.

(10) Patent No.: US 8,148,681 B2
(45) Date of Patent: Apr. 3, 2012

(54) MICROENGINEERED VACUUM INTERFACE FOR AN IONIZATION SYSTEM

(75) Inventors: Richard Syms, London (GB); Richard William Moseley, West Kensington (GB)

(73) Assignee: Microsaic Systems PLC, Woking, Surrey (GB)

( * ) Notice: Subject to any disclaimer, the term of this patent is extended or adjusted under 35 U.S.C. 154(b) by 88 days.

(21) Appl. No.: 12/837,100

(22) Filed: Jul. 15, 2010

(65) Prior Publication Data

US 2010/0276590 A1 Nov. 4, 2010

Related U.S. Application Data

(63) Continuation of application No. 11/810,052, filed on Jun. 4, 2007, now Pat. No. 7,786,434.

(30) Foreign Application Priority Data

Jun. 8, 2006 (GB) .................................. 0611221.3
Oct. 12, 2006 (GB) .................................. 0620256.8

(51) Int. Cl.
*H01J 49/00* (2006.01)
*B01D 59/44* (2006.01)

(52) U.S. Cl. ......................... 250/288; 250/281; 250/282

(58) Field of Classification Search .................. 250/281, 250/282, 285, 288, 397, 423 R, 526
See application file for complete search history.

(56) References Cited

U.S. PATENT DOCUMENTS

| | | | | |
|---|---|---|---|---|
| 5,155,357 | A * | 10/1992 | Hemond | 250/291 |
| 5,432,343 | A * | 7/1995 | Gulcicek et al. | 250/288 |
| 5,747,815 | A * | 5/1998 | Young et al. | 250/423 R |
| 5,750,993 | A * | 5/1998 | Bier | 250/282 |
| 5,939,718 | A * | 8/1999 | Yamada et al. | 250/288 |
| 6,878,930 | B1 * | 4/2005 | Willoughby et al. | 250/281 |
| 7,531,134 | B1 * | 5/2009 | Anderson et al. | 422/62 |
| 7,786,434 | B2 * | 8/2010 | Syms et al. | 250/288 |
| 2008/0001082 | A1 * | 1/2008 | Syms et al. | 250/288 |
| 2008/0185515 | A1 * | 8/2008 | Tai et al. | 250/288 |

* cited by examiner

*Primary Examiner* — Bernard E Souw
(74) *Attorney, Agent, or Firm* — Bishop & Diehl, Ltd.

(57) ABSTRACT

A planar component for interfacing an atmospheric pressure ionizer to a vacuum system is described. The component combines electrostatic optics and skimmers with an internal chamber that can be filled with a gas at a prescribed pressure and is fabricated by lithography, etching and bonding of silicon.

19 Claims, 8 Drawing Sheets a)

b)

a)

b)

a)

b)

a)

b)

MICROENGINEERED VACUUM INTERFACE FOR AN IONIZATION SYSTEM

CROSS-REFERENCE TO RELATED APPLICATIONS

This application is a continuation of U.S. patent application Ser. No. 11/810,052 filed on Jun. 4, 2007, which claims priority to the United Kingdom Patent Application No. GB0611221.3, filed Jun. 8, 2006, and United Kingdom Patent Application No. GB0620256.8, filed Oct. 12, 2006, which are expressly incorporated herein by reference.

TECHNICAL FIELD OF THE INVENTION

This invention relates to mass spectrometry, and in particular to the use of mass spectrometry in conjunction with liquid chromatography or capillary electrophoresis. The invention more particularly relates to a microengineered interface device for use in mass spectrometry systems.

BACKGROUND OF THE INVENTION

Electrospray is a method of coupling ions derived from a liquid source such as a liquid chromatograph or capillary electrophoresis system into a vacuum analysis system such as a mass spectrometer (Whitehouse et al. 1985; U.S. Pat. No. 4,531,056). The liquid is typically a dilute solution of analyte in a solvent. The spray is induced by the action of a strong electric field at the end of capillary containing the liquid. The electric field draws the liquid out from the capillary into a Taylor cone, which emits a high-velocity spray at a threshold field that depends on the physical properties of the liquid (such as its conductivity and surface tension) and the diameter of the capillary. Increasingly, small capillaries known as nanospray capillaries are used to reduce the threshold electric field and the volume of spray (U.S. Pat. No. 5,788,166).

The spray typically contains a mixture of ions and droplets, which in turn contain a considerable fraction of low-mass solvent. The problem is generally to couple the majority of the analyte as ions into the vacuum system, at thermal velocities, without contaminating the inlet or introducing an excess background of solvent ions or neutrals. The vacuum interface carries out this function. Capillaries or apertured diaphragms can restrict the overall flow into the vacuum system. Conical apertured diaphragms, often known as molecular separators or skimmers can provide momentum separation of ions from light molecules from within a gas jet emerging into an intermediate vacuum (Bruins 1987; Duffin 1992; U.S. Pat. No. 3,803,811, U.S. Pat. No. 6,703,610; U.S. Pat. No. 7,098,452). Off-axis spray (USRE35413E) and obstructions (U.S. Pat. No. 6,248,999) can reduce line-of-sight contamination by droplets, and orthogonal ion sampling (U.S. Pat. No. 6,797,946) can reduce contamination still further. Arrays of small, closely spaced apertures can improve the coupling of ions over neutrals (U.S. Pat. No. 6,818,889). Co-operating electrodes (U.S. Pat. No. 5,157,260) and quadrupole ion guides (U.S. Pat. No. 4,963,736) can apply fields to encourage the preferential transmission of ions. The use of a differentially pumped chamber containing a gas at intermediate pressure can thermalise ion velocities, while the use of heated ion channels (U.S. Pat. No. 5,304,798) can encourage droplet desolvation. The device of U.S. Pat. No. 5,304,798 is fabricated in a thermally and electrically conductive material, and is a massive device, the heated channel being of the order of 1-4 cm long.

Vacuum interfaces are now highly developed, and can provide extremely low-noise ion sampling with low contamination. However, the use of macroscopic components results in orifices and chambers that are unnecessary large for nanospray emitters and that require large, high capacity pumps. Furthermore, the assemblies must be constructed from precisely machined metal elements separated by insulating, vacuum-tight seals. Consequently, they are complex and expensive, and require significant cleaning and maintenance.

SUMMARY OF THE INVENTION

These problems and others are addressed by the present invention by providing key elements of an interface to a vacuum system as a miniaturised component with reduced orifice and channel sizes thereby reducing the size and pumping requirements of vacuum interfaces. The advance over prior art is achieved by using the methods of microengineering technology such as lithography, etching and bonding of silicon to fabricate suitable electrodes, skimmers, gas flow channels and chambers. In further embodiments the invention provides for a making of such components with integral insulators and vacuum seals so that they may ultimately be disposable.

Accordingly the invention provides an interface component according to claim 1 with advantageous embodiments provided in the dependent claims thereto. A method of fabricating an interface is also provided in claim 15.

These and other features of the invention will be understood with reference to the following figures.

DETAILED DESCRIPTION OF THE DRAWINGS

A detailed description of the invention is provided with reference to exemplary embodiments shown in FIGS. 1 to 8.

Figure 1:
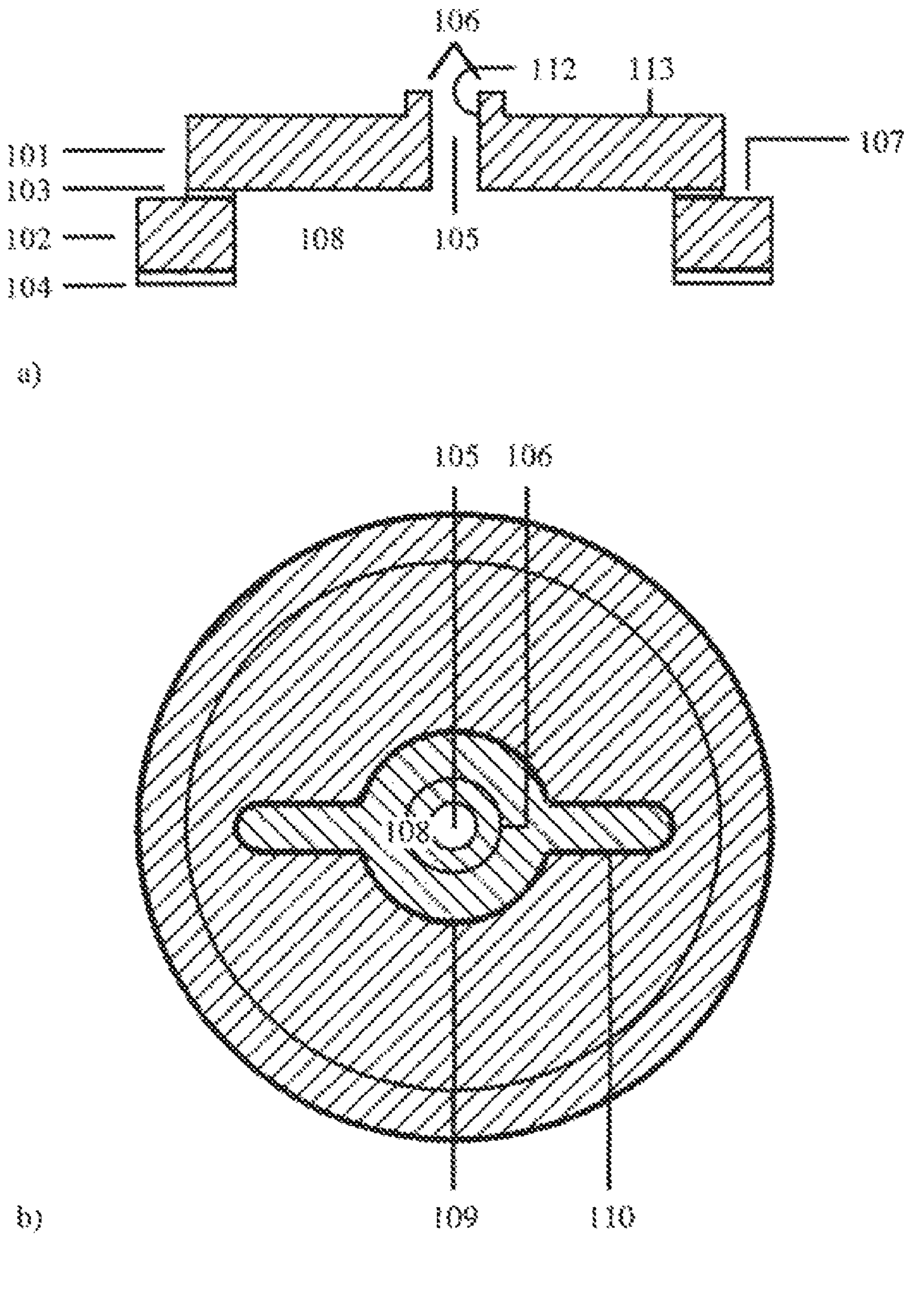
FIG. 1 shows in section (1_a_) and plan (1_b_) view the first two layers of a planar microengineered vacuum interface for an electrospray ionization system according to the present invention.

A device in accordance with the teaching of the invention is desirably fabricated or constructed as a stacked assembly of semiconducting substrates, which are desirably formed from silicon. Such techniques will be well known to the person skilled in the art of microengineering. FIG. 1 shows the first substrate, which is constructed as a multilayer. A first layer of silicon 101 is attached to a second layer of silicon 102 by an insulating layer of silicon dioxide 103. Such material is known as bonded silicon on insulator (BSOI) and is available commercially in wafer form. A further insulating layer 104 is provided on the outside of the second silicon layer.

The first silicon layer carries or defines a first central orifice 105. The interior side walls 112 of the first layer which define the orifice, include a proud or upstanding feature 106 on the outer side of the first wafer which is provided at a higher level than the remainder of the top surface 113 of the first layer. The outer region of the first wafer and the insulating layer are both removed, so that the second wafer is exposed in these peripheral regions 107. These peripheral regions define a step between the first and second wafer layers, and as will be described later may be used for locating external electrical connectors or the like. The second silicon layer carries an inner chamber 108, which consists of a second central orifice 109 intercepted by a transverse lateral passage 110, shown in the plan view of FIG. 1B. In this way a skimmer, channel, capillary or series of orifices may be fabricated by means of micromachining, semiconductor processes or MEMS technology.

The features 105, 106, 107, 109 and 110 may all be formed by photolithography and by combinations of silicon and silicon dioxide etching process that are well known in the art. In particular, deep reactive ion etching using an inductively coupled plasma etcher is a highly anisotropic process that may be used to form high aspect ratio features (>10:1) at high rates (2-4 μm/min). The etching may be carried out to full wafer thickness using silicon dioxide or photoresist as a mask, and may conveniently stop on oxide interlayers similar to the layer 103. The minimum feature size that can be etched through a full-wafer thickness (500 μm) is typically smaller than can be obtained by mechanical drilling.

Figure 2:
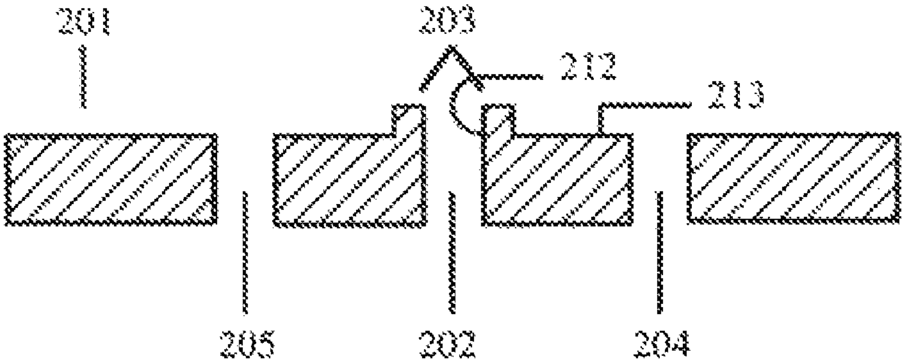
FIG. 2 shows in section (1_a_) and plan (1_b_) view a third layer of a planar microengineered vacuum interface for an electrospray ionization system according to the present invention.
Figure 2:
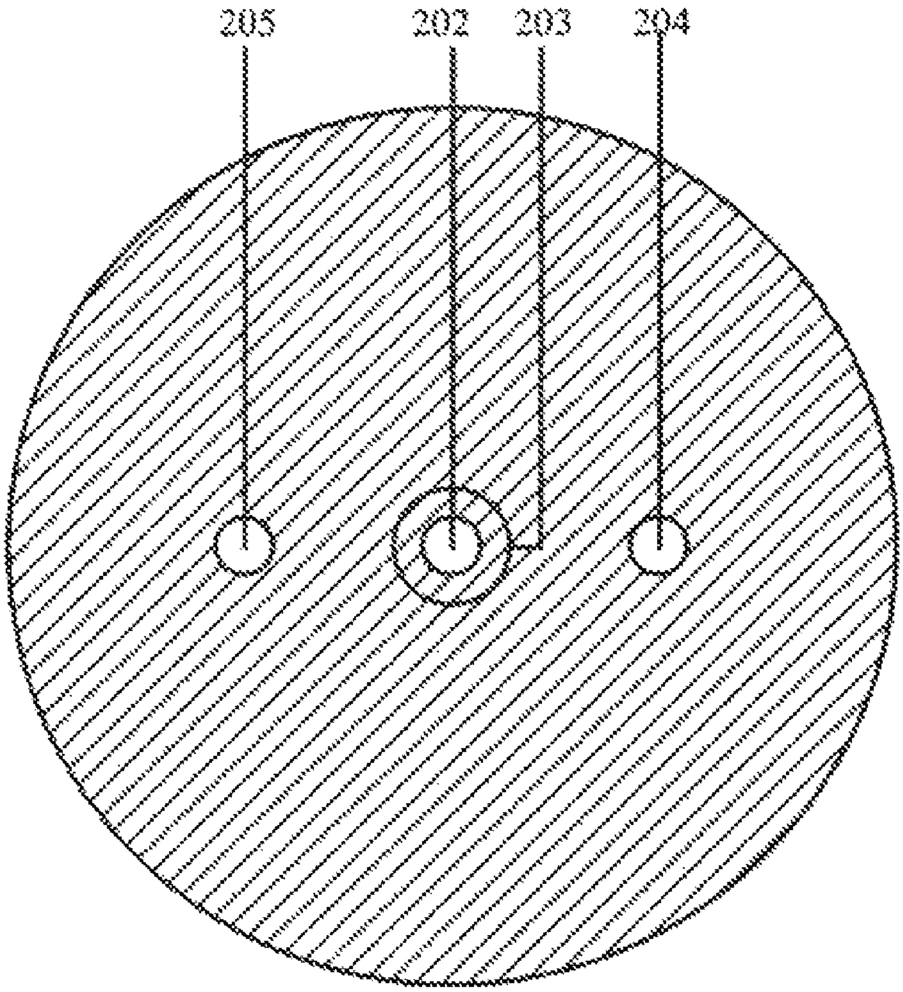

FIG. 2 shows the second substrate, which is constructed as a single layer. A layer of silicon 201 carries or defines a central orifice 202, the side walls 212 of which define a proud feature 203 upstanding from the top surface 213 of the second substrate. Two additional orifices 204 and 205 are also defined in this wafer and are arranged on either side of the central orifice 202. The features 202, 203, 204 and 205 may again be formed by photolithography and by silicon etching processes that are well known in the art.

Figure 3:
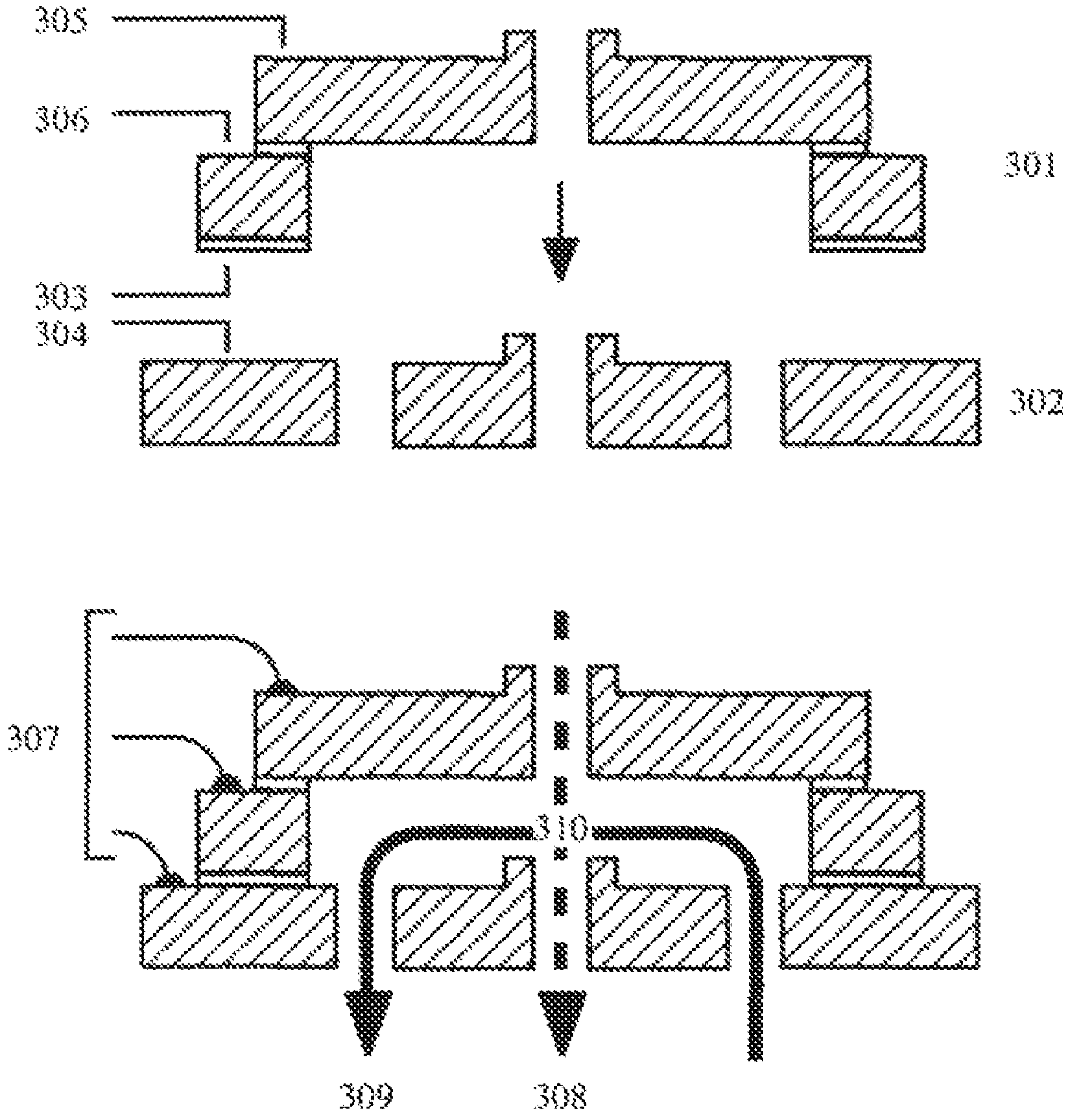
FIG. 3 shows how a planar microengineered vacuum interface for an electrospray ionization system may be formed by a stacking arrangement.

FIG. 3 shows the attachment of the first substrate 301 to the second substrate 302 in a stacked assembly. The prefix numbers used in FIGS. 1 and 2 are changed to 3, but the supplementary numbers remain the same. The two contacting surfaces 303 and 304 are desirably metallised, so that the two substrates may be aligned and attached together by compression bonding or by soldering, so that a hermetically sealed joint is formed around the periphery of the assembly. Additional features may be provided to aid alignment, or allow self-alignment. The metallisation also provides an improved electrical contact to the second substrate 302. The two additional surfaces 305 and 306 are also desirably metallised, to provide improved electrical contact to the two silicon layers of the first substrate 301. Bond wires 307 are then attached to all three silicon layers of the stacked assembly. The two substrates may be coupled to one another in a manner to ensure that the central orifices of each of the two substrates coincide thereby defining a central channel or cavity 310 through the two substrates. Alternative configurations may benefit from a non-alignment of the central orifices such that a non-linear channel is defined through the substrate. Such arrangements will be apparent to the person skilled in the art.

It will be appreciated that the stacked assembly of the three features 105, 109 and 202 now form a set of three cylindrical or semi-cylindrical surfaces, which can provide a three-element electrostatic lens that can act on a separately provided ion stream 308 passing through the assembly. Such a lens arrangement may be configured as an Einzel lens, with the associated benefits of such arrangements as will be appreciated by those skilled in the art. It will also be appreciated that the three features 204, 205 and 110 now form a continuous passageway through which a gas stream 309 may flow, intercepting the ion stream 308 in the central cavity 310. The intersection, although shown schematically as being one where the two channels are mutually perpendicular to one another is, it will be appreciated, an example of the type of arrangement that may be used. Alternatives may include arrangements specifically configured to enable a generation of a vortex or any other rotational mixing of the two streams through the angular presentation of one channel to the other.

Figure 4:
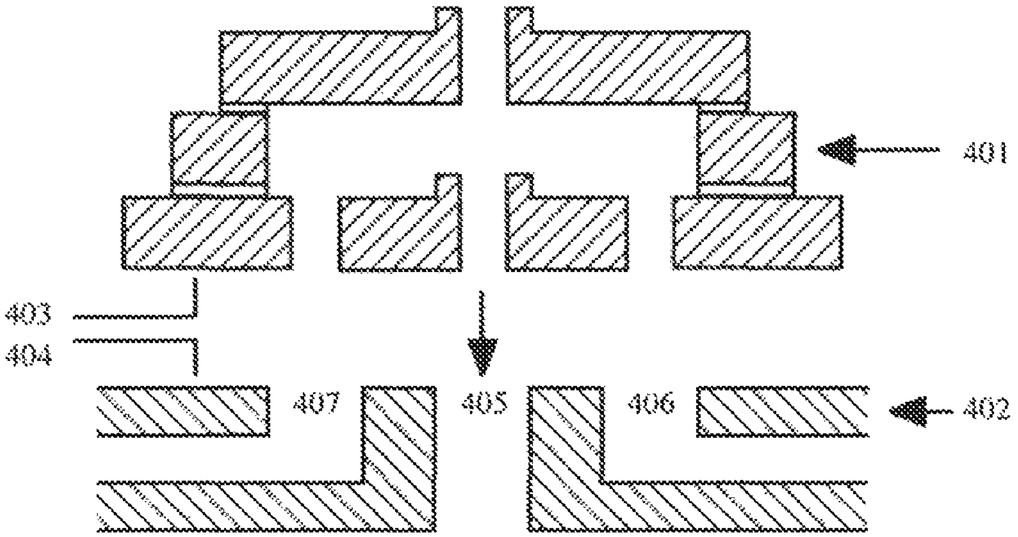
FIG. 4 shows a mounting of an assembled planar microengineered vacuum interface for an electrospray ionization system on a flange according to the teachings of the present invention, with FIG. 4_a_ being prior to assembly and FIG. 4_b_ an assembled interface.
Figure 4:
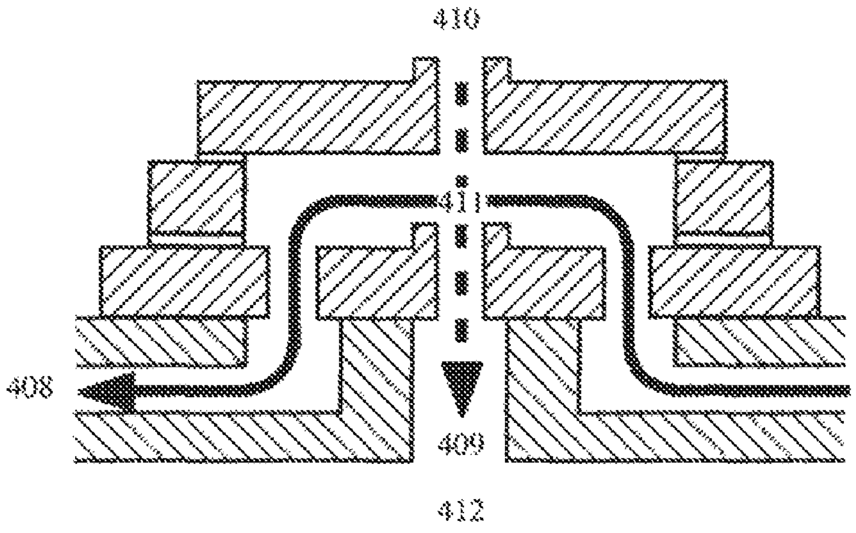

FIG. 4 shows the attachment of the stacked assembly 401 to a third substrate 402 that is desirably formed in a metal. The third substrate again carries a central orifice 405 and in addition an inlet passageway 406 and an outlet passageway 407. The features 406 and 407 may be formed by conventional machining, using methods that are well known in the art. The two contacting surfaces 403 and 404 are desirably metallised, so that the two substrates may again be attached together by compression bonding or by soldering, so that a hermetically sealed joint is again formed around the periphery of the assembly.

It will be appreciated that the combined assembly now provides a continuous passageway for the gas stream 408 that starts and ends in the metal layer, in which connections to an additional inlet and outlet pipe may easily be formed by conventional machining. It will also be appreciated that the ion stream 409 now passes through the metal substrate, which is now sufficiently robust to form part of the enclosure of a vacuum chamber. It will also be appreciated that with the addition of such a chamber, the three regions 410, 411 and 412 may be maintained at different pressures.

Figure 5:
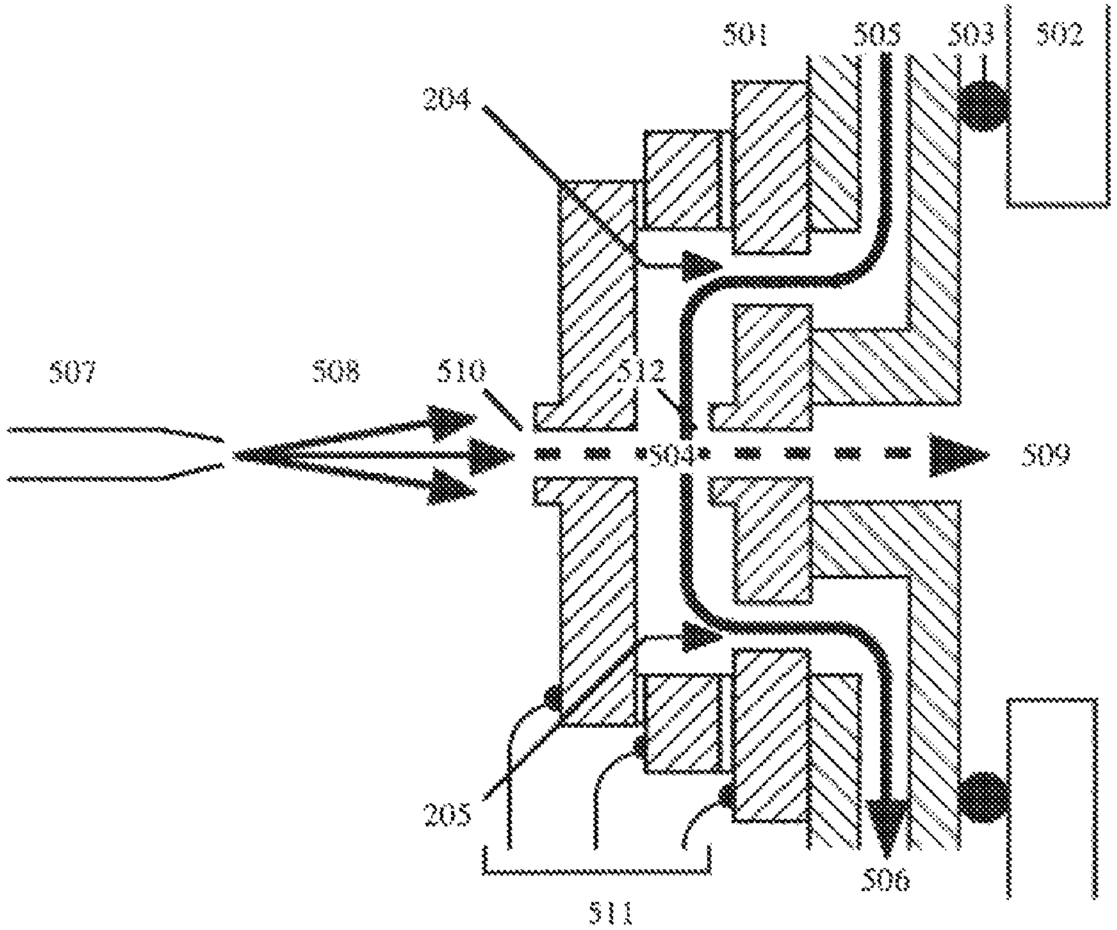
FIG. 5 shows a mounting arrangement for using a planar microengineered vacuum interface with a capillary electrospray source according to the present invention.

FIG. 5 shows how the assembly 501 may be mounted on the wall of a vacuum chamber 502 using an ‘O-ring’ seal 503. In use, the inside of the vacuum chamber is evacuated to low pressure, while the outside is at atmospheric pressure. The central cavity 504 is maintained at an intermediate pressure by passing a stream of a suitable drying gas such as nitrogen from an inlet 505 to an outlet 506 connected to a roughing pump. It will be appreciated that the pressure in the central cavity may be suitably controlled using different combinations of inlet pressure and roughing pump capacity and by the relative sizes of the openings 204 and 205.

The flux of ions is provided from a capillary 507 containing a liquid that is (for example) derived from a liquid chromatography system or capillary electrophoresis system in the form of analyte molecules dissolved in a solvent. The flux of ions is generated as a spray 508 by providing a suitable electric field near the capillary. In addition to the desired analyte ions, which it is desired to pass as an ion stream 509 into the vacuum chamber, the spray typically contains neutrals and droplets with a high concentration of solvent.

Ions and charged droplets in the spray may be concentrated into the inlet of the assembly by the first lens element carrying the proud feature 510, which is maintained at a suitable potential by one of the connections 511 provided on external surfaces of the first, second or third wafers. Entering the central chamber 504, the ion velocities may be thermalised and the spray may be desolvated by collision with the gas molecules contained therein. The gas stream may be heated to promote desolvation, for example by RF heating caused by applying an alternating voltage between two adjacent lens elements and causing an alternating current to flow through the silicon. Alternative mechanisms of achieving heating of the stream may include a heating prior to entry into the interface device where for example it is considered undesirable to actively heat the materials of the interface device.

Ions may be further concentrated at the outlet of the assembly by the second lens element and the third element carrying the proud feature 512, which are also maintained at suitable potentials by the remaining connections 511.

Figure 6:
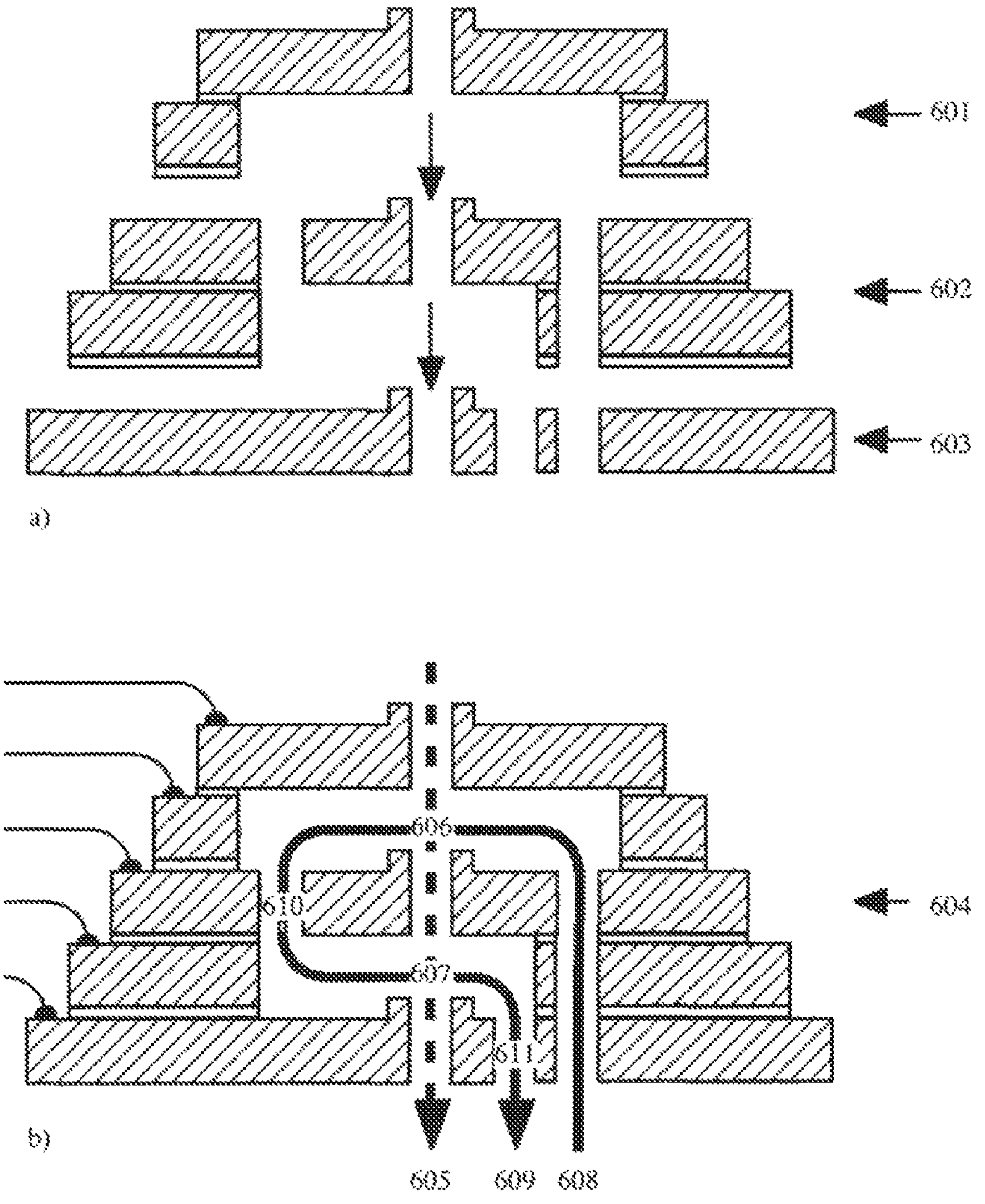
FIG. 6 shows a construction of a two stage planar microengineered vacuum interface for an electrospray ionization system according to another embodiment of the present invention.

It will be appreciated that more complex assemblies of a similar type may be constructed. For example, FIG. 6 shows the combination of two etched BSOI substrates 601 and 602 with a third single-layer substrate 603 to form a serial array in the form of a S-layer assembly 604. Here the ion stream 605 must pass now through two cavities 606 and 607 at intermediate and successively reducing pressures. The gas therein is again provided by a gas stream taken from an inlet 608 to an outlet 609 by a system of buried, etched channels that pass through the two chambers 606 and 607. The relative pressure in the two chambers 606 and 607 may be controlled, by varying the dimensions of the connecting orifices 610 and 611. Such a system corresponds to a two-stage vacuum interface, and it will be apparent that interfaces with even more stages may be constructed by stacking additional layers.

Heretofore an interface component in accordance with the teaching of the invention has been described with reference to an exemplary arrangement where a laminated silicon interface is provided to allow transport of an ion stream between atmospheric pressure and vacuum through a pair of orifices sandwiching a chamber held at intermediate pressure.

As was described above, such an interface may be constructed from a pair of silicon substrates. Where so constructed, the outer substrate may be fabricated from a silicon-oxide-silicon bilayer, while the inner substrate may be provided in the form of a silicon monolayer. As was described wither reference to FIGS. 3 and 4, these two substrates may then be hermetically bonded together, and then bonded to a stainless steel vacuum flange containing a gas channel. As was illustrated with reference to FIG. 5, the completed assembly may then be used to couple an ion stream from a spraying device into a vacuum system. The preferential transmission of ions (as opposed to neutrals) is encouraged in such an arrangement by a judicious application of appropriate voltages to the three silicon layers. In the exemplary illustrative embodiments, the outer and inner layers contained field-concentrating features, while the inner layer contained a chamber. The three elements acted together to focus an ion stream emerging from the outer orifice onto the inner orifice.

Such an arrangement may be successfully used to effect ion transmission and to obtain mass spectra from the resulting ion stream. The arrangement and performance may however benefit from one or more modifications, the specifics of which will be described as follows.

As will be appreciated from the teaching of the invention most features of the interface component may be fabricated using standard patterning, etching and metallisation processes, as will be familiar to those skilled in the art.

Figure 7:
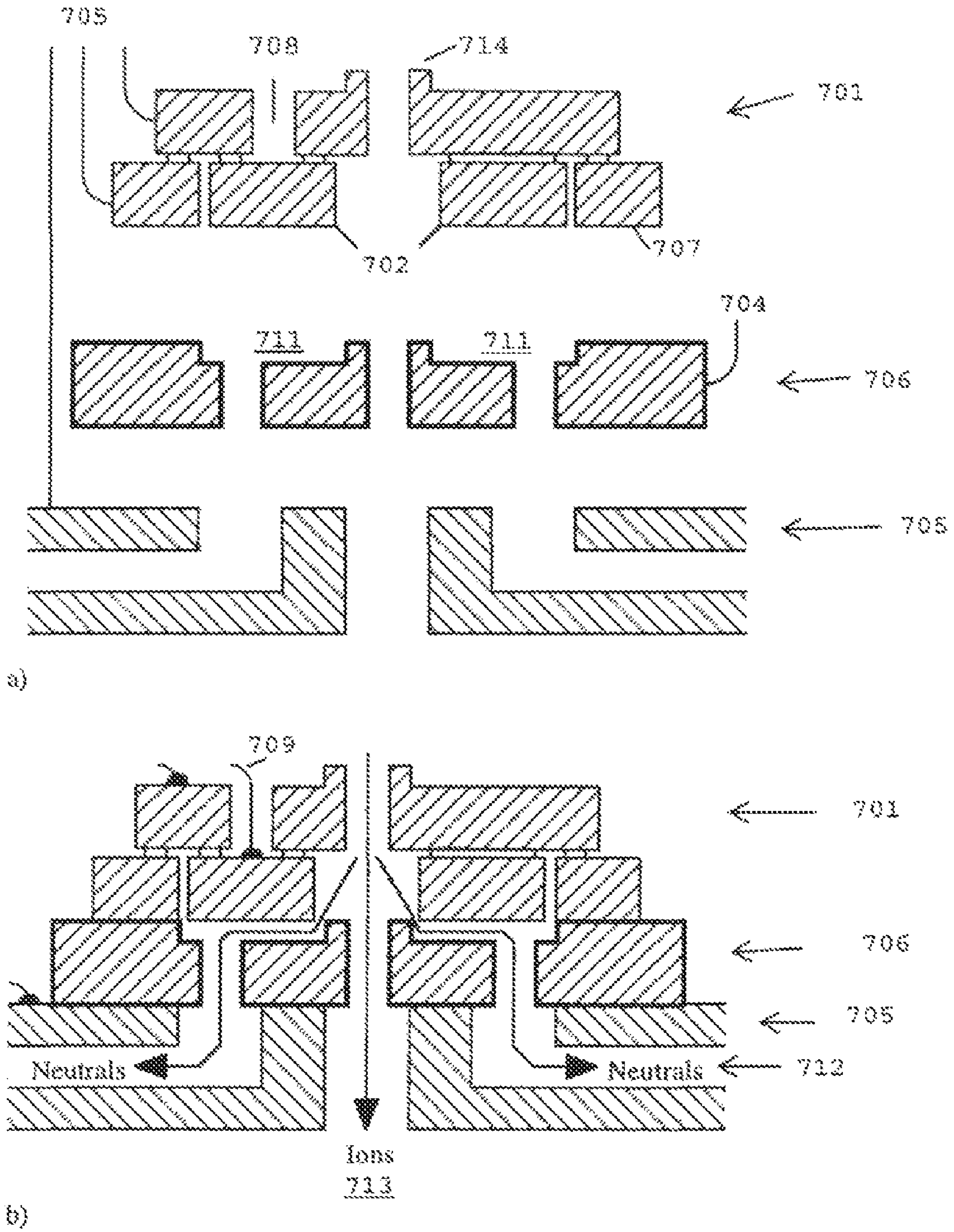
FIG. 7 shows a modification to the arrangement of FIG. 6 including a suspended internal electrode.
Figure 8:
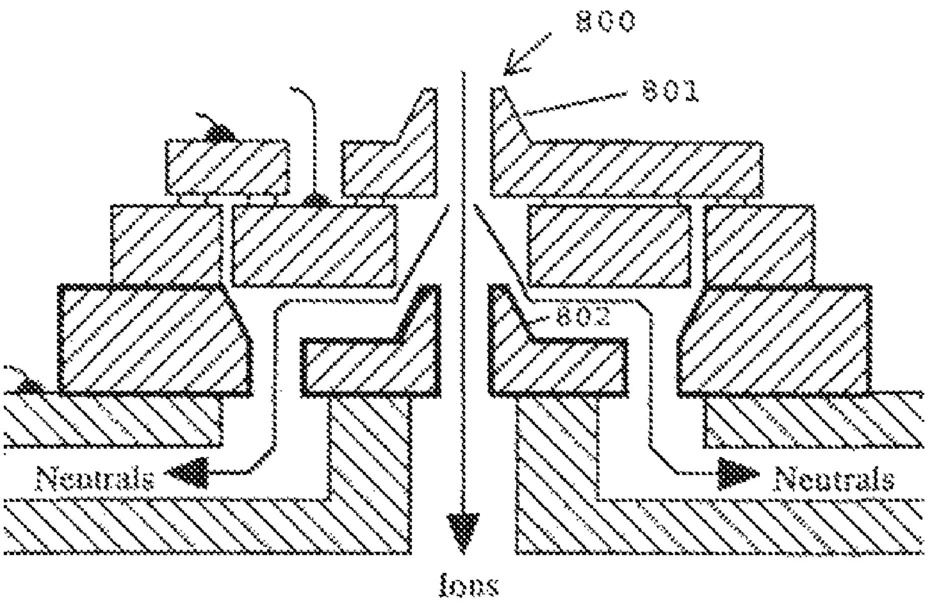
FIG. 8 shows how field concentrating features may be shaped to provide improved field concentration and improved momentum separation of molecules according to the teaching of the invention.
Figure 8:
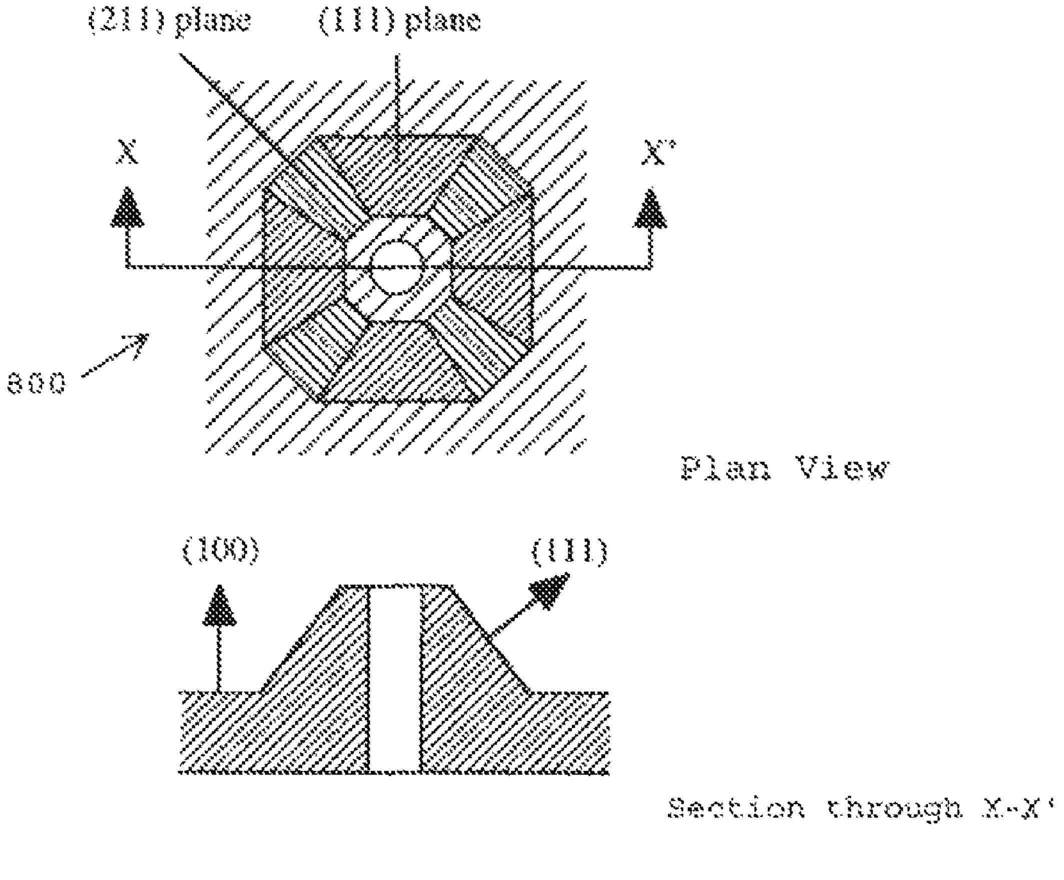

FIG. 7 shows an alternative arrangement for providing an interface component according to an aspect of the invention. It will be recalled from the discussion of FIG. 3 that the option of bonding the two surfaces 303, 304 together by means of a solder joint was expressed. While such an arrangement does provide the necessary coupling between the two surfaces it does present a possibility of a short circuit being formed by the solder across the isolating layer of oxide 104 between the lower substrate 302 and the lower layer of the upper substrate 301—this possibility arising from their very close proximity to one another. If such a short circuit is effected then it is difficult to apply a different voltage to the two layers.

The arrangement of FIG. 7 obviates the need to co-locate a soldered joint with an insulating layer. In the arrangement of FIG. 7, an upper substrate 701 is configured to contain a laterally isolated electrode 702, which is suspended inside a perimeter of silicon. The surfaces 703 of the upper substrate and the flange 705 may be coated with a conducting material which is desirably un-reactive and non-oxide forming-gold being a suitable example. Surfaces 704 of the lower substrate 706 may be solder coated.

To assemble such an arrangement, each of the two substrates 701, 706 may be stacked on the flange 705 and then secured by a melting of the solder 704, as shown in FIG. 7*b*. Although a short circuit is now always created between the lower substrate 706 and a lower contacting layer 707 of the upper substrate 701, its existence is immaterial, as the suspended electrode 702 is isolated from these contacted surfaces. By providing an access hole 708 through the upper substrate 701, a different voltage can now be applied to the suspended electrode 702 via a bond wire 709 passing through the access hole. The utilisation of a suspended electrode also allows the distances between the electrode and the lower substrate to be reduced at the point of the ion path 713.

In the arrangement of FIG. 1, a channel 110 was described as passing through a central chamber 109, to allow the passage of gas during pumping. While such an arrangement suffices to provide for the passage of gas, it is desirable to have a large cross-section area for this passage in order to obtain effective pumping of the intermediate chamber. In the arrangement of FIG. 1, this cross section area is difficult to achieve without effecting a removal of most of the walls of the chamber 109, which could affect the ion focusing capabilities.

In the arrangement of FIG. 7, it will be noted that the lower substrate 706 is provided with a pair of recess features 711 which are co-located with the suspended electrodes 702 of the upper substrate. The provision of the recess features is advantageous in that it ensures that the suspended electrode does not come into contact with the lower substrate 706 when the two substrates are brought into intimate contact with one another—FIG. 7*b*. It will be noted that the recess features 711 are dimensioned sufficiently to avoid electrical contact between the lower substrate and the suspended electrode. A secondary or additional benefit is provided in that the recess features 711 provide a gas flow path 712. This path can be advantageously used either to remove neutrals or to admit a drying gas, without the need to pass a channel across the layer containing the central chamber. Consequently, the channel may be omitted entirely from this layer. This arrangement may provide more effective ion focussing.

In the arrangement of FIG. 7, field concentrating features 714, 715 in the upper and lower substrates are essentially raised capillaries. In a further modification to the exemplary embodiments heretofore described it is possible to provide improved field concentration and improved momentum separation of ions and neutrals if the outer walls 801, 802 of these features are sloped at around 60°, as shown in FIG. 8*a*.

It is generally difficult to construct features with well-controlled, continually varying slopes using standard microfabrication processes such as dry etching. However, features with approximately correct slopes may be constructed by crystal plane etching. In silicon, the (111) planes can be shown to etch much more slowly than all other planes in certain wet etchants, for example potassium hydroxide. These planes lie at an angle $\cos^{-1}(1/\sqrt{3})=54.73°$ to the surface of a (100) oriented wafer, and provide a natural boundary to etched features. The (211) planes also etch relatively slowly.

A proud feature 800 whose surfaces consist of four (111) planes and four (211) planes as shown in FIG. 8*b* may be therefore constructed by etching a (100) wafer carrying a surface mask of etch resistant material such as silicon dioxide, which is patterned to form a square. Such a feature may therefore provide improved field concentration and momentum separation, and could be used independently of an interface component for coupling an ion source to a vacuum system—as will be appreciated by those skilled in the art could the suspended electrode of FIG. 7.

It will also be appreciated that there is considerable scope for variations in layout and dimension in the arrangements above. For example, it is not necessary for the ion path to be co-linear from input to output, and reduced contamination of the vacuum system may follow from adopting a staggered ion path so that no line of sight exists. Similarly, it is not necessary for both of the orifices to be circular in geometry, and reduced contamination may again arise from (for example) the combination of a first circular orifice with a second circular annular orifice.

It will also be appreciated that the silicon parts may be fabricated in a batch process so that the assembly may be provided as a low-cost disposable element. Finally, it will be appreciated that because the entire vacuum interface is now reduced in size, a plurality of similar elements may be constructed as an array on a common substrate. The array may then provide interfaces for a plurality of electrospray capillaries.

It will be understood that what has been described herein are exemplary embodiments of microengineered interface components which are provided to illustrate the teaching of the invention yet are not to be construed in any way limiting except as may be deemed necessary in the light of the appended claims. Whereas the invention has been described with reference to a specific number of layers it will be understood that any stack arrangement comprising a plurality of individually patterned semiconducting layers with adjacent layers being separated from one another by insulating layers, and orifice defined within the layers defining a conduit through the stack should be considered as falling within the scope of the claimed invention.

Within the context of the present invention the term microengineered or microengineering is intended to define the fabrication of three dimensional structures and devices with dimensions in the order of microns. It combines the technologies of microelectronics and micromachining. Microelectronics allows the fabrication of integrated circuits from silicon wafers whereas micromachining is the production of three-dimensional structures, primarily from silicon wafers. This may be achieved by removal of material from the wafer or addition of material on or in the wafer. The attractions of microengineering may be summarised as batch fabrication of devices leading to reduced production costs, miniaturisation resulting in materials savings, miniaturisation resulting in faster response times and reduced device invasiveness. Wide varieties of techniques exist for the microengineering of wafers, and will be well known to the person skilled in the art. The techniques may be divided into those related to the removal of material and those pertaining to the deposition or addition of material to the wafer. Examples of the former include:

Wet chemical etching (anisotropic and isotropic)
Electrochemical or photo assisted electrochemical etching
Dry plasma or reactive ion etching
Ion beam milling
Laser machining
Eximer laser machining Whereas examples of the latter include:

Evaporation
Thick film deposition
Sputtering
Electroplating
Electroforming
Moulding
Chemical vapour deposition (CVD)
Epitaxy These techniques can be combined with wafer bonding to produce complex three-dimensional, examples of which are the interface devices provided by the present invention.

While the device of the invention has been described as an interface component it will be appreciated that such a device could be provided either separate to or integral with the other components to which it provides an interface between. By using an interface component it is possible to remove impurities or other unwanted components of the emitted spray material from the capillary needle conventionally used with mass spectrometer system.

It will be further understood that whereas the present invention has been described with reference to an exemplary application, that of interfacing an ionization source-specifically an electrospray ionization source—with a mass spectrometry system, that interface components according to the teaching of the invention could be used in any application that requires a coupling of an ion beam from an ionization source provided at a first pressure to another device that is provided at a second pressure. Typically this second pressure will be lower than the first pressure but it is not intended to limit the present invention in any way except as may be deemed necessary in the light of the appended claims.

Where the words "upper", "lower", "top", bottom, "interior", "exterior" and the like have been used, it will be understood that these are used to convey the mutual arrangement of the layers relative to one another and are not to be interpreted as limiting the invention to such a configuration where for example a surface designated a top surface is not above a surface designated a lower surface.

Furthermore, the words comprises/comprising when used in this specification are to specify the presence of stated features, integers, steps or components but does not preclude the presence or addition of one or more other features, integers, steps, components or groups thereof.

The invention claimed is:

1. A disposable microengineered interface component for coupling between a separate atmospheric pressure ionization source and a separate vacuum system, the interface component providing for a transmission of an ion beam generated by the ionization source to the vacuum system, the interface being formed from a material having an orifice defined therein so as to provide a channel in the material through which the ion beam may be received into and through the interface component prior to being presented to the vacuum system.

2. The interface component as claimed in claim 1 wherein the material is conductive.

3. The interface component of claim 1 wherein the material has a skimmer defined therein.

4. The interface component as claimed in claim 1 comprising a patterned surface.

5. The interface component as claimed in claim 1 comprising a plurality of patterned surfaces, each of the surfaces having an orifice defined therein.

6. The interface component as claimed in claim 5 wherein the plurality of surfaces are provided on individual layers, the layers being provided in a stack arrangement with adjacent layers being separated from one another by insulating layers.

7. The interface component as in claim 5, in which the plurality of orifices act as a conduit for ions being transmitted from the ionization source to the vacuum system.

8. The interface component as in claim 1 being configured to be heated.

9. The interface component as in claim 1 configured to be attached to a vacuum flange.

10. The interface component as in claim 1 wherein the vacuum system forms part of a mass spectrometer system, the interface component, in use, providing for an introduction of ions into the mass spectrometer system.

11. The interface component as in claim 1 wherein the ionization source is coupled to a liquid chromatography or capillary electrophoresis system.

12. The interface component as in claim 1 comprising a plurality of individually conducting layers provided in a stack arrangement with adjacent layers being separated from one another by insulating layers, and wherein each of the layers have an orifice defined therein, the stacking of the layers enabling an alignment of each of the orifices so as to provide a contiguous channel through the component.

13. The interface component as claimed in claim 12 wherein the assembled stack arrangement further includes an interior chamber, defined by a patterning of the individual layers, the interior chamber defining a second channel through the component, the first and second channels intersecting one another.

14. An ionization system including a vacuum system having an entrance port, the entrance port being arranged to be coupled to an interface component as claimed in claim 1 and wherein the interface component enables a transmission of an ion beam from an ionizer to the vacuum system.

15. A method of fabricating an ionization interface for coupling between a separate atmospheric pressure ionization source and a separate vacuum system, the method comprising the microengineering steps of:

a) providing a substrate material:

b) removing a portion of the material to define an orifice in the substrate, the orifice extending from a first side of the substrate to a second side of the substrate so as to provide a channel through the substrate through which an ion beam may operably pass from the atmospheric ionization source to the vacuum system.

16. The method of claim 15 wherein the removal of material is effected using laser machining of the material.

17. The method of claim 15 wherein the removal of material is effected using drilling of the material.

18. The method of claim 15 wherein the material is a semiconducting material.

19. A method of fabricating an ionization interface for coupling between a separate atmospheric pressure ionization source and a separate vacuum system, the method comprising the microengineering steps of forming a conduit in a material, the conduit defining a passage for an ion beam generated in the atmospheric pressure ionization source to the vacuum system.

* * * * *